(12) United States Patent
Zeiger et al.

(10) Patent No.: US 7,706,645 B2
(45) Date of Patent: Apr. 27, 2010

(54) OPTICAL COMMUNICATION SYSTEM ADAPTED FOR RECEIVING AN OPTICAL SIGNAL AT A PLURALITY OF DIFFERENT POSITIONS

(75) Inventors: David R. Zeiger, Mundelein, IL (US); Mark A. Barabolak, Elmhurst, IL (US); Maninder S. Sehmbey, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 279 days.

(21) Appl. No.: 11/616,497

(22) Filed: Dec. 27, 2006

(65) Prior Publication Data

US 2008/0159699 A1 Jul. 3, 2008

(51) Int. Cl.
*G02B 6/26* (2006.01)
(52) U.S. Cl. .................... 385/31; 455/575.3
(58) Field of Classification Search .............. 398/1, 398/107, 109, 110, 115, 128–129, 135–136; 385/49, 51–57, 72–3, 75–8, 92–94, 88; 455/575.4
See application file for complete search history.

(56) References Cited

U.S. PATENT DOCUMENTS

| | | | | |
|---|---|---|---|---|
| 3,936,795 A * | 2/1976 | Nishioka et al. | ............ | 338/119 |
| 3,952,277 A * | 4/1976 | Nishioka et al. | ............ | 338/119 |
| 4,208,087 A * | 6/1980 | Cooper et al. | ............... | 359/557 |
| 4,302,267 A * | 11/1981 | Palmer et al. | ............... | 156/158 |
| 4,408,378 A * | 10/1983 | Ketteringham et al. | ........ | 28/289 |
| 4,447,119 A * | 5/1984 | Beasley | ..................... | 385/137 |
| 4,505,540 A * | 3/1985 | Furusawa et al. | ........... | 385/138 |
| 4,546,249 A * | 10/1985 | Whitehouse et al. | ... | 250/227.11 |
| 4,565,487 A * | 1/1986 | Kroczynski | ................. | 414/730 |
| 4,909,589 A * | 3/1990 | Morris | ....................... | 385/25 |
| 4,958,932 A * | 9/1990 | Kegelman et al. | ........... | 356/636 |
| 5,138,676 A * | 8/1992 | Stowe et al. | .................. | 385/32 |
| 5,348,359 A * | 9/1994 | Boozer | ........................ | 294/24 |
| 5,408,773 A * | 4/1995 | Hwang | ........................ | 40/547 |
| 5,494,447 A * | 2/1996 | Zaidan | ........................ | 439/31 |
| 6,400,655 B1 * | 6/2002 | Kim | ........................ | 369/13.33 |
| 6,460,221 B1 * | 10/2002 | Eromaki | ..................... | 16/286 |
| 6,530,784 B1 * | 3/2003 | Yim et al. | .................... | 439/31 |
| 2002/0035317 A1 * | 3/2002 | Cheng et al. | ................ | 600/322 |
| 2002/0097964 A1 * | 7/2002 | Roehrs et al. | ................ | 385/59 |
| 2004/0052477 A1 * | 3/2004 | Morrison | .................... | 385/88 |
| 2004/0146251 A1 * | 7/2004 | Kudo | ......................... | 385/88 |
| 2005/0085693 A1 * | 4/2005 | Belson et al. | ............... | 600/146 |

(Continued)

*Primary Examiner*—Frank G Font
*Assistant Examiner*—Peter Radkowski
(74) *Attorney, Agent, or Firm*—Lawrence J. Chapa (57) ABSTRACT

An optical communication system (200) for transmitting light between a first housing (102) and a second housing (104) of a device (100) is provided. The first housing and the second housing are adapted to move relative to one another between a plurality of usage positions. The optical communication system includes a first optical communication element (202), a second optical communication element (204), and an optical waveguide (206). The first optical communication element is capable of emitting light and can be coupled to one of the first and second housing. The second optical communication element is capable of receiving the light and can be coupled to the housing to which the first optical communication element is not coupled. The optical waveguide is capable of conveying the light emitted by the first to the second optical communication element. The second optical communication element can substantially encompass a locus of the output light.

20 Claims, 4 Drawing Sheets

U.S. PATENT DOCUMENTS

2006/0197943 A1* 9/2006 Kewitsch .................. 356/73.1
2007/0032275 A1* 2/2007 Suzuki et al. ............ 455/575.3
2007/0297727 A1* 12/2007 Ueno et al. .................. 385/93

* cited by examiner

OPTICAL COMMUNICATION SYSTEM ADAPTED FOR RECEIVING AN OPTICAL SIGNAL AT A PLURALITY OF DIFFERENT POSITIONS

FIELD OF THE INVENTION

The present invention relates generally to a communication system between multiple housings of a device, the multiple housings being adapted to move relative to one another, and more specifically, to an optical communication system having an optical communication element adapted to receive an optical signal at a plurality of different positions.

BACKGROUND OF THE INVENTION

In recent times, the use of active elements in a communication device the need to communicate with one another has substantially increased. Examples of the active elements include, but are not limited to, a camera, a display, and a fingerprint sensor. The active elements need to be physically linked and/or communicatively coupled to other elements in the communication device. Examples of the communication device include, but are not limited to, a mobile phone, a radio telephone, a music playback device (i.e. an MP3 player), a pager, a laptop computer, a desktop computer, and a Personal Digital Assistant (PDA). In at least one commonly used configuration, the communication device can include a first housing and a second housing, which can be adapted to move relative to one another. A sufficiently large number of the active elements, which need to communicate with one another are coupled to alternative ones of the first housing and/or the second housing of the communication device. This results in a substantial amount of data, such as video content and audio content, that needs to be transmitted between the first housing and the second housing.

In one of the known methods for transmitting data between the first housing and the second housing, the data is routed via a multi-layer electric flex circuit. The multi-layer electric flex circuit generally includes multiple layers of high-density conductive traces interleaved with an insulating material. The multi-layer electric flex circuit passes through a restricted space between the first and the second housing. However, the multi-layer electric flex circuit can be mechanically unreliable and can cause greater radio-frequency interference when a greater number of signals and/or signals having higher data rates are routed via the flex circuit through the restricted space. In another known method, the data is serialized before transmission. This can highly simplify the multi-layer electric flex circuit and improve the mechanical reliability and cost associated with the multi-layer electric flex circuit. However, this does not always result in the reduction of radio-frequency interference to a level at or below a desired level, as the data rates often need to increase to accommodate the fewer number of communication paths.

In light of the above mentioned discussion, there is a need for a communication system for data transmission between the multiple housings of a communication device which can limit the radio-frequency interference. The communication system should be capable of transmitting an increased amount of data without increasing the radio-frequency interference. Further, the communication system should enable relatively high-speed data transmission between the multiple housings.

SUMMARY OF THE INVENTION

The present invention provides an optical communication system for transmitting light between a first housing and a second housing of a device. In the present invention, a signal in the form of light (i.e. an electromagnetic radiation) is used in the device for data transmission between a first optical communication element and a second optical communication element of the device. In at least one embodiment of the present invention, the optical communication system for transmitting the light between the first housing and the second housing of the device is provided. The first housing and the second housing can be adapted to move relative to one another, a distance corresponding to a travel distance between a plurality of usage positions. The optical communication system includes a first optical communication element, a second optical communication element, and an optical waveguide. The first optical communication element can emit the light and can be coupled to either the first housing or the second housing. The second optical communication element can receive the light and can be coupled to other one of the first housing and the second housing to which the first optical communication element is not coupled. The optical waveguide can convey the light emitted by the first optical communication element to the second optical communication element. The output light from the optical waveguide is adapted to be received by the second optical communication element at each of a plurality of different positions of an end of the optical waveguide as the first and second housings move between the plurality of usage positions.

In a further embodiment of the present invention, a device is provided. The device can include a two-part housing and one or more optical communication systems. The two-part housing can include a first housing and a second housing. The first housing and the second housing can be adapted to move relative to one another between a plurality of usage positions. The one or more optical communication systems can transmit light between the first housing and the second housing. Further, each optical communication system of the one or more optical communication systems can include a first optical communication element, a second optical communication element, and an optical waveguide. The first optical communication element can emit the light and can be coupled to either the first housing or the second housing. The second optical communication element can receive the light and can be coupled to other one of the first housing and the second housing to which the first optical communication element is not coupled. The optical waveguide can convey the light emitted by the first optical communication element to the second optical communication element. The output light from the optical waveguide is adapted to be received by the second optical communication element at each of a plurality of different positions of an end of the optical waveguide as the first and second housings move between the plurality of usage positions.

These and other features, as well as the advantages of this invention, are evident from the following description of one or more embodiments of this invention, with reference to the accompanying figures.

BRIEF DESCRIPTION OF FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular system for communication, in accordance with the present invention, it should be observed that the present invention resides primarily as apparatus components related to an optical communication system. Accordingly, the apparatus components have been represented where appropriate by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' 'includes,' or any other variation thereof are intended to cover a non-exclusive inclusion, such that an article or apparatus that comprises a list of elements does not include only those elements, but may include other elements that are not expressly listed or inherent in such an article or apparatus. An element proceeded by 'comprises . . . a' does not, without more constraints, preclude the existence of additional identical elements in the article or apparatus that comprises the element. The term 'another,' as used in this document, is defined as at least a second or more. The terms 'includes' and/or 'having', as used herein, are defined as comprising.

Figure 1:
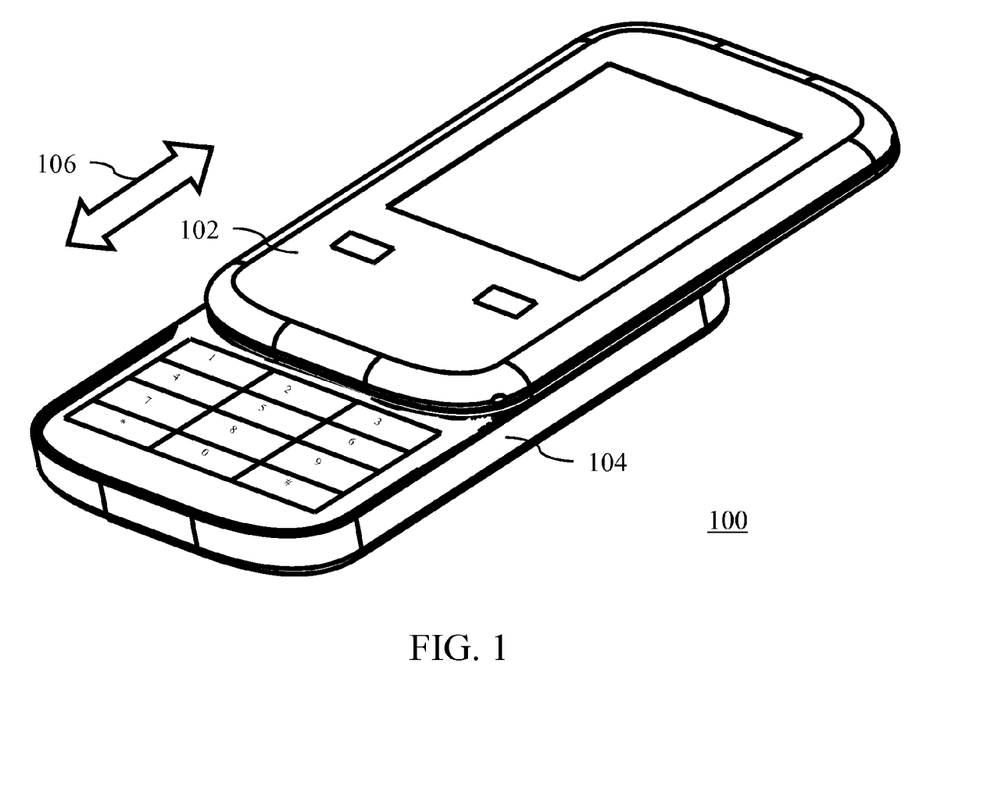
FIG. 1 illustrates a device having a first housing and a second housing that are adapted to move relative to one another, where various embodiments of the present invention can be applicable.

FIG. 1 illustrates a device 100 having a first housing 102 and a second housing 104, where various embodiments of the present invention can be applicable. The first housing 102 and the second housing 104 are adapted to move relative to one another. Examples of the device 100 can include, but are not limited to, a wireless communication device, a radio telephone, a pager, a laptop computer, a music playback device (i.e. an MP3 Player), and a personal digital assistant (PDA). The first housing 102 and the second housing 104 can move relative to one another a distance corresponding to a travel distance of either the first housing 102 or the second housing 104, between a plurality of different usage positions. The travel distance is the relative distance traversed either by the first housing 102 or the second housing 104 with respect to the other while moving relative to each other. In at least one embodiment, the plurality of the different usage positions can include, but are not limited to, a closed position and an open position of either the first housing 102 or the second housing 104. An arrow 106 in FIG. 1 illustrates the potential movement of the first housing 102 and the second housing 104 relative to one another, which can result in the closed position, the open position, and any number of positions in between. In the particular embodiment illustrated in FIG. 1, the first housing 102 and the second housing 104 can travel along a pair of substantially parallel paths relative to one another. This is sometimes referred to as the slider configuration of the device 100.

In a further embodiment of the present invention, either the first housing 102 or the second housing 104 can include one or more active elements that need to be physically and/or communicatively coupled to one or more corresponding elements present on either the same or the other one of the first housing 102 and the second housing 104. Examples of the active elements can include, but are not limited to, a camera, a display, and a fingerprint sensor. For example, a camera present on the first housing 102 may need to be communicatively coupled to a microprocessor present on the second housing 104.

Figure 2:
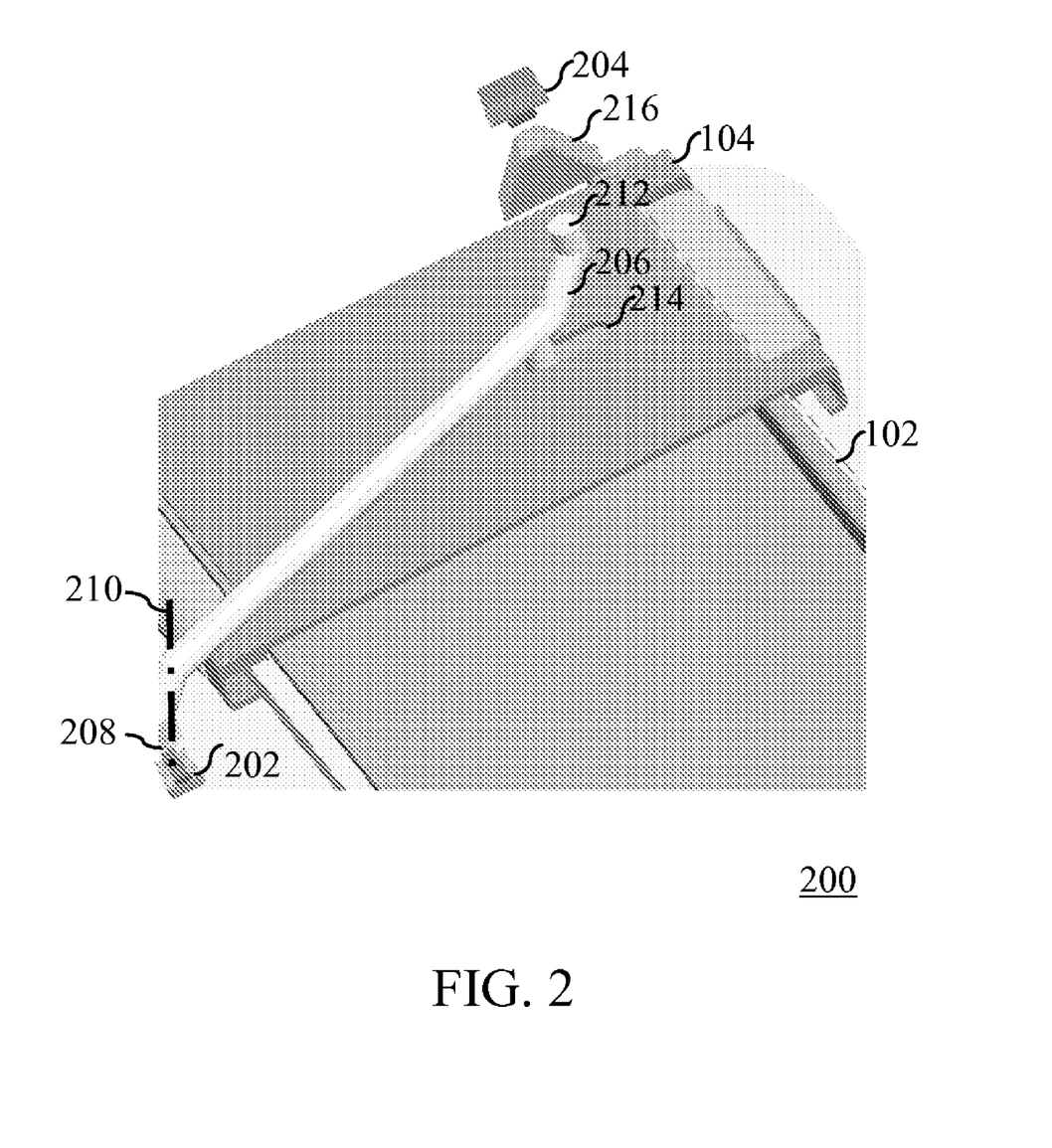
FIG. 2 illustrates an optical communication system for use in a device having a first housing and a second housing, which move relative to one another, in accordance with at least one embodiment of the present invention.

FIG. 2 illustrates an optical communication system 200 for use in a device having the first housing 102 and the second housing 104, in accordance with at least one embodiment of the present invention. Examples of the device can include the device 100 illustrated in FIG. 1. Though the optical communication system 200 is explained in conjunction with FIG. 1, it would be apparent to a person ordinarily skilled in the art that the optical communication system 200 can be implemented in communication devices having other types of configurations.

The optical communication system 200 includes a first optical communication element 202, a second optical communication element 204, and an optical waveguide 206. The first optical communication element 202 can emit light. Examples of the first optical communication element 202 can include, but are not limited to, a laser source, a light emitting diode, a vertical-cavity surface emitting laser, and an edge-emitting diode. Further, the first optical communication element 202 can be coupled to either the first housing 102 or the second housing 104. For the purpose of this description, the first optical communication element 202 is shown to be coupled to the first housing 102. In at least one embodiment, the first optical communication element 202 can produce the light having one or more controlled characteristics. Examples of the one or more controlled characteristics of the light can include, but are not limited to, amplitude, frequency, and phase. The one or more characteristics can be varied in accordance with a characteristic of an incoming signal to encode and/or superimpose a stream of data on the light produced. The stream of data can be received from one or more active elements. For example, the light emitted by the first optical communication element 202 can be varied in accordance with a current applied to it.

In at least one embodiment, the light emitted by the first optical communication element 202 can be received by the second optical communication element 204. The second optical communication element 204 can be coupled to the other one of the first housing 102 and the second housing 104 to which the first optical communication element 202 is not coupled. For the purpose of this description, the second optical communication element 204 is shown to be coupled to the second housing 104. The second optical communication element 204 can include either or both of one or more point optical communication elements and one or more strip optical communication elements. An example of the point optical communication element can include a photo-diode. Further, an example of the strip optical communication element can include a photo-detector strip. In at least one embodiment, the optical communication system 200 can include an electrical summation circuit. The electrical summation circuit can sum up the detected photo-current by either or both of the one or more point optical communication elements and the one or more strip optical communication elements.

In at least one embodiment, the light is conveyed to the second optical communication element 204 by the optical waveguide 206. The optical waveguide 206 can convey the light emitted by the first optical communication element 202 to the second optical communication element 204. Examples of the optical waveguide 206 can include, but are not limited to, a rigid waveguide, a flexible waveguide, a light pipe, an optical fiber, and an acrylic fiber. In at least one embodiment of the present invention, a first end 208 of the optical waveguide 206 can be coupled to either the first housing 102 or the second housing 104 to which the first optical communication element 202 is coupled. For example, the first end 208 can be coupled to the first housing 102 by a rotary joint. Examples of the rotary joint can include, but are not limited to, a pivot joint, a single channel rotary joint, and a multi channel rotary joint. The rotary joint can allow the optical waveguide 206 to rotate about an axis 210 that can pass through the first end 208. The axis 210 can be perpendicular to a plane along which the first housing 102 can move with respect to the second housing 104. The first end 208 can receive the light emitted by the first optical communication element 202. The optical waveguide 206 can output the light through a second end 212 of the optical waveguide 206 to the second optical communication element 204.

In at least one embodiment, the second end 212 can be coupled to either the first housing 102 or the second housing 104 to which the second optical communication element 204 is coupled, using a grooved-pin joint 214. For the purpose of this description, the second end 212 is shown to be coupled to the second housing 104. The grooved-pin joint 214 can enable transformation of a rotatory motion of the optical waveguide 206 about the axis 210 to a translation motion of the second end 212 with respect to the second housing 104.

When the first housing 102 moves relative to the second housing 104 from an open position to a closed position or vice-versa, coupling of the optical waveguide 206 at both the ends causes the second end 212 to move in a restricted path with respect to the second housing 104. This restricted path can be referred to as a locus of the output light, and corresponds to each of a plurality of different positions of the end of the optical waveguide corresponding to the second optical communication element as the first and second housing move between the plurality of use positions. The locus of the output light is explained in detail in the description of FIG. 3. The second optical communication element 204 can substantially encompass the locus of the output light emitted by the optical waveguide 206 between the plurality of usage positions. Further, in at least some instances, the second optical communication element 204 can receive the light at some or all of the intermediate positions in between.

In at least one embodiment, a pin of the grooved-pin joint 214 can act as the second end 212 which can output the light conveyed by the optical waveguide 206. In this embodiment, the locus of the output light can coincide with a groove of the grooved-pin joint 214.

In the embodiment, where the optical waveguide 206 is a flexible waveguide, the second end 212 can be coupled to the second housing 104 using a rotary joint. The rotary joint can allow the optical waveguide 206 to rotate about an axis that can pass through the second end 212. The axis is perpendicular to the plane along which the first housing 102 moves with respect to the second housing 104. Further, the optical communication system 200 can include an optical light collector 216. The optical light collector 216 can direct the output light from the second end 212 of the optical waveguide 206 to the second optical communication element 204. Examples of the optical light collector 216 can include, but are not limited to, a lens, a compound parabolic collector, a cone, and a V-shaped guide. The optical light collector 216 can substantially encompass the locus of the output light.

It is apparent that a person ordinarily skilled in the art will appreciate that the optical communication system 200 can include additional components that are not shown here since they are not germane to the operation of the optical communication system 200, in accordance with the inventive arrangements.

Figure 3:
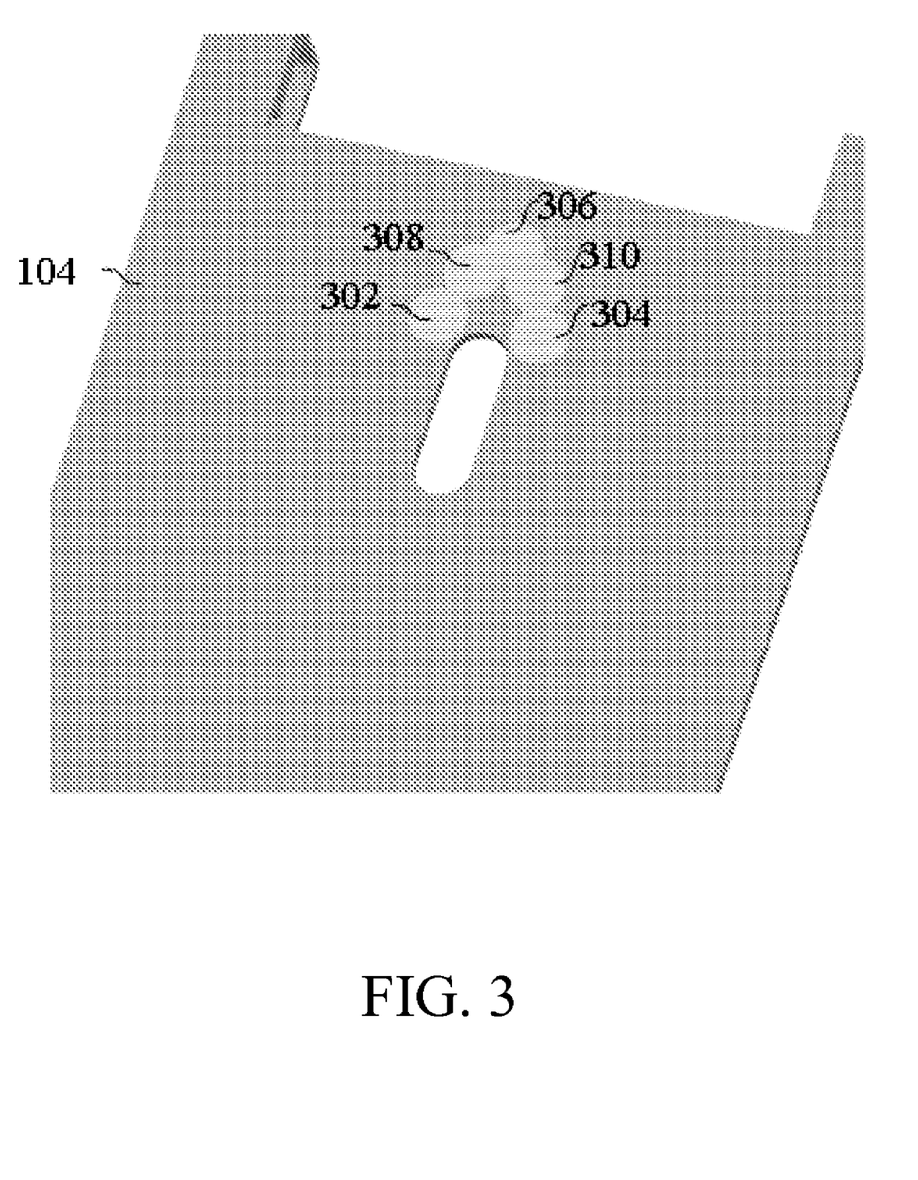
FIG. 3 illustrates a plurality of different positions of an end of the optical waveguide as the first and second housings move between the plurality of usage positions, in accordance with at least one embodiment of the present invention.

FIG. 3 illustrates a locus of output light with respect to a housing of an optical communication system, in accordance with at least one embodiment of the present invention. For the purpose of this description, the locus of the output light with respect to the second housing 104 has been illustrated. The locus of the output light with respect to the second housing 104 is illustrated by output positions 302, 304, 306, 308 and 310. It is apparent that a person ordinarily skilled in the art will appreciate that the locus of the output light can include one or more intermediate output positions between the illustrated output positions output positions 302, 304, 306, 308 and 310. As noted previously, the output positions 302, 304, 306, 308 and 310, each represent the respective positions of the second end 212 of the optical waveguide 206 with respect to the second housing when the first housing 102 moves with respect to the second housing 104. The output position 302 can represent a position of the output light for an open position of the first housing 102 with respect to the second housing 104. The output position 304 can represent the position of the output light for a closed position. The output position 306 can represent the position of the output light for a position partially halfway between the open and the closed positions. The output positions 308 and 310 can represent the position of the output light for further intermediate positions.

In at least one embodiment, the second optical communication element 204 can substantially encompass the locus of the output light as described above. This can enable the second optical communication element 204 to receive the output light at all of the usage positions.

Figure 4:
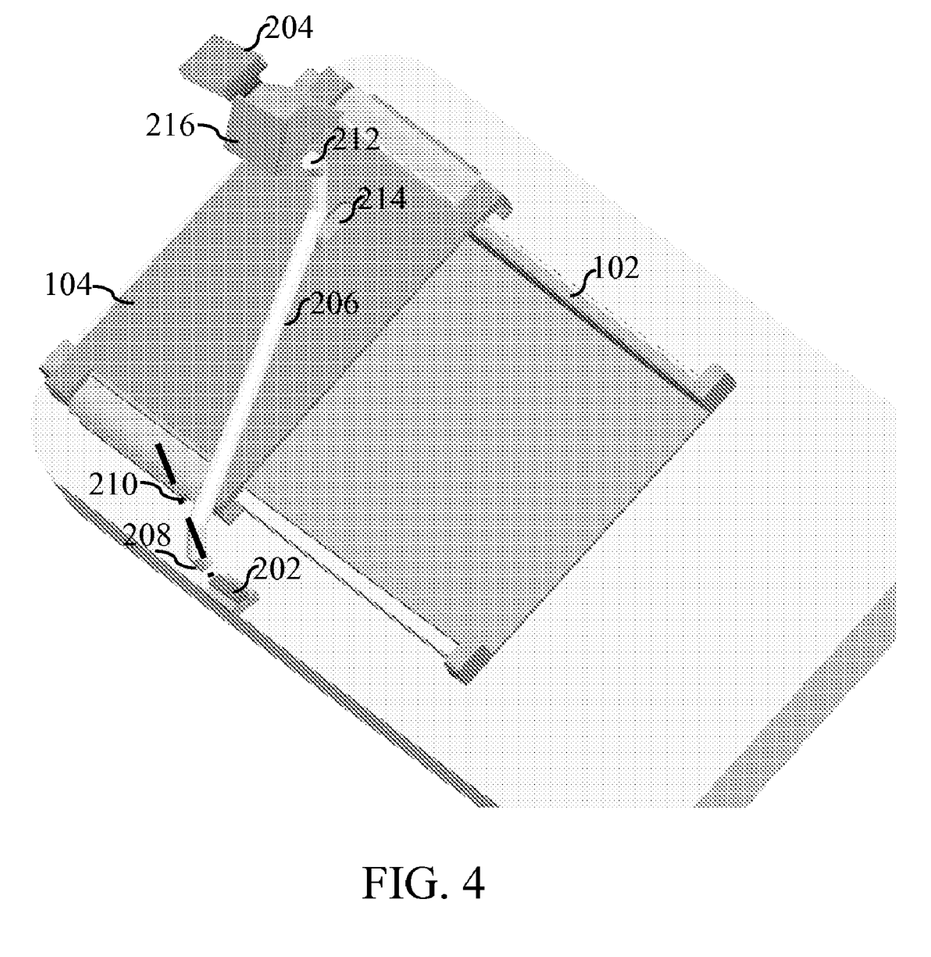
FIG. 4 illustrates a view of an optical communication system for use in a device having a two-part housing, in accordance with at least one embodiment of the present invention.

FIG. 4 illustrates a view of the optical communication system 200 for use in a device having a two-part housing, in accordance with at least one embodiment of the present invention. Examples of the device can include the device 100, illustrated in FIG. 1. The device can include a two-part housing and one or more optical communication systems. The two-part housing can include the first housing 102 and the second housing 104. The first housing 102 and the second housing 104 can be adapted to move relative to one another between a plurality of usage positions. For the purpose of this description, the device is shown to include one optical communication system 200.

Similar to the optical communication system described in connection with FIG. 2, the optical communication system 200 can transmit light between the first housing 102 and the second housing 104. The optical communication system 200 can include the first optical communication element 202, the second optical communication element 204, and the optical waveguide 206. The first optical communication element 202 can emit the light. Further, the first optical communication element 202 can be coupled to either the first housing 102 or the second housing 104. For the purpose of this description, the first optical communication element 202 is shown to be coupled to the first housing 102.

The second optical communication element 204 can receive the light. Further, the second optical communication element 204 can be coupled to other one of the first housing 102 and the second housing 104 to which the first optical communication element 202 is not coupled. The light received by the second optical communication element 204 is conveyed to it by the optical waveguide 206. The optical waveguide 206 can convey the light emitted by the first optical communication element 202 to the second optical communication element 204. The second optical communication element 204 can substantially encompass a locus of the output light emitted by the optical waveguide 206 between the plurality of usage positions. The first end 208 of the optical waveguide 206 is illustrated to be coupled to the first housing 102 to which the first optical communication element 202 is coupled using a rotary joint. Further, the second end 212 is illustrated to be coupled to the second housing 104 to which the second optical communication element 204 is coupled. The second end 212 can be coupled using a grooved-pin joint 214.

The optical light collector 216 of the optical communication system 200 can direct the output light from the second end 212 to the second optical communication element 204. The optical light collector 216 can substantially encompass the locus of the output light.

In at least one embodiment, the device can include a first optical communication system and a second optical communication system to enable two-way transmission of light between the first housing 102 and the second housing 104. The first optical communication element of the first optical communication system can be coupled to the first housing 102 and the second optical communication element of the first optical communication system can be coupled to the second housing 104. The first optical communication element of the second optical communication system can be coupled to the second housing 104 and the second optical communication element of the second optical communication system can be coupled to the first housing 102. Further, the optical waveguide of the first optical communication system can convey the light emitted by the first optical communication element to the second optical communication element of the first optical communication system. Similarly, the optical waveguide of the second optical communication system can convey the light emitted by the first optical communication element to the second optical communication element of the second optical communication system.

In at least one embodiment of the present invention, the first optical communication system and the second optical communication system can include a single optical waveguide. The optical waveguide can be capable of conveying the light emitted by the first optical communication element to the second optical communication element of each of the first optical communication system and the second optical communication system.

Those ordinarily skilled in the art will appreciate that the device can include all or even a fewer number of components than the components shown in FIG. 4. Further, those ordinarily skilled in the art will understand that the device can include additional components that are not shown here since they are not germane to the operation of the device, in accordance with the inventive arrangements.

Various embodiments of the present invention, as described above, provide an optical communication system for transmitting light between a first housing and a second housing of a device. The optical communication system in the present invention does not involve the use of a multi-layer electric flex circuit, thereby increasing reliability of the device, avoiding a source of radio-frequency interference, and simplifying assembly of the device. Further, the invention provides a compact system that enables optical data transmission between the first housing and the second housing of the device.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense and all such modifications are intended to be included within the scope of the present invention. The benefits, advantages, solutions to problems and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of those claims, as issued.

What is claimed is:

1. An optical communication system for transmitting light between a first housing and a second housing of a device, the first housing and the second housing adapted to move relative to one another a distance corresponding to a travel distance between a plurality of usage positions, the optical communication system comprising:
   a first optical communication element capable of emitting the light, the first optical communication element being coupled to one of the first housing and the second housing;
   a second optical communication element capable of receiving the light, the second optical communication element being coupled to other one of the first housing and the second housing to which the first optical communication element is not coupled; and
   an optical waveguide capable of conveying the light emitted by the first optical communication element to the second optical communication element; and
   wherein the output light from the optical waveguide is capable of being received by the second optical communication element at each of a plurality of different laterally offset positions of an end of the optical waveguide, relative to the other one of the first housing and the second housing to which the second optical communication element is coupled, as the first and second housings move between the plurality of usage positions.

2. An optical communication system of claim 1, wherein the first housing and the second housing travel along respective ones of a pair of substantially parallel paths during the movement of the first housing and the second housing relative to one another.

3. An optical communication system of claim 1, wherein the first housing and the second housing are incorporated as part of a communication device having a slider configuration.

4. An optical communication system of claim 1, wherein a first end of the optical waveguide is coupled to one of the first housing and the second housing to which the first optical communication element is coupled, the first end being coupled using a rotary joint, wherein the first end receives the light emitted by the first optical communication element.

5. An optical communication system of claim 1, wherein a second end of the optical waveguide is coupled to one of the first housing and the second housing to which the second optical communication element is coupled, the second end being coupled using one of a grooved-pin joint and a rotary joint, wherein the second end outputs the light conveyed by the optical waveguide to the second optical communication element, and wherein the grooved-pin joint includes a groove having a lengthwise dimension within which a pin is received, where a pin associated with the second end of the optical waveguide is adapted to travel along the groove in the lengthwise dimension as the first housing moves relative to the second housing.

6. An optical communication system of claim 1 further comprising an optical light collector capable of directing the output light to the second optical communication element.

7. An optical communication system of claim 6, wherein the optical light collector is selected from the group comprising a lens, a compound parabolic collector, a cone, and a V-shaped guide.

8. An optical communication system of claim 1, wherein the optical waveguide is selected from the group comprising a rigid waveguide, a flexible waveguide, a light pipe, an optical fiber, and an acrylic fiber.

9. An optical communication system of claim 1, wherein the first optical communication element is selected from the group comprising a laser source, a light emitting diode, a vertical-cavity surface emitting laser, and an edge-emitting diode.

10. An optical communication system of claim 1, wherein the second optical communication element is at least one of one or more point optical communication elements and one or more strip optical communication elements.

11. An optical communication system of claim 10, wherein the one or more point optical communication elements is a photo-diode.

12. An optical communication system of claim 10, wherein the one or more strip optical communication elements is a photo-detector strip.

13. A device comprising:
   a two-part housing comprising a first housing and a second housing, wherein the first housing and the second housing are adapted to move relative to one another between a plurality of usage positions; and
   one or more optical communication systems for transmitting light between the first housing and the second housing, each optical communication system of the one or more optical communication systems comprising:
       a first optical communication element capable of emitting the light, the first optical communication element being coupled to one of the first housing and the second housing;
       a second optical communication element capable of receiving the light, the second optical communication element being coupled to other one of the first housing and the second housing to which the first optical communication element is not coupled; and
       an optical waveguide capable of conveying the light emitted by the first optical communication element to the second optical communication element; and
       wherein the output light from the optical waveguide is capable of being received by the second optical communication element at each of a plurality of different laterally offset positions of an end of the optical waveguide, relative to the other one of the first housing and the second housing to which the second optical communication element is coupled, as the first and second housings move between the plurality of usage positions.

14. A device of claim 13, wherein a first end of the optical waveguide of the each optical communication system of the one or more optical communication systems is coupled to one of the first housing and the second housing to which the first optical communication element is coupled, the first end being coupled using a rotary joint, wherein the first end receives the light emitted by the first optical communication element.

15. A device of claim 13, wherein a second end of the optical waveguide of the each optical communication system of the one or more optical communication systems is coupled to one of the first housing and the second housing to which the second optical communication element is coupled, the second end being coupled using one of a grooved-pin joint and a rotary joint, wherein the second end outputs the light conveyed by the optical waveguide to the second optical communication element, and wherein the grooved-pin joint includes a groove having a lengthwise dimension within which a pin is received, where a pin associated with the second end of the optical waveguide is adapted to travel along the groove in the lengthwise dimension as the first housing moves relative to the second housing.

16. A device of claim 13, wherein the one or more optical communication systems comprises a first optical communication system and a second optical communication system;
   wherein the first optical communication element of the first optical communication system is coupled to the first housing, and the second optical communication element of the first optical communication system is coupled to the second housing;
   wherein the first optical communication element of the second optical communication system is coupled to the second housing, and the second optical communication element of the second optical communication system is coupled to the first housing; and
   wherein the optical waveguide of each of the first optical communication system and the second optical communication system is capable of conveying the light emitted by the first optical communication element to the second optical communication element.

17. A device of claim 16, wherein the one or more optical communication systems comprises one optical waveguide capable of conveying the light emitted by the first optical communication element to the second optical communication element of each of the first optical communication system and the second optical communication system.

18. A device of claim 13, wherein the each optical communication system of the one or more optical communication systems further comprises an optical light collector capable of directing the output light conveyed by the optical waveguide to the second optical communication element.

19. A device of claim 18, wherein the optical light collector is selected from the group comprising a lens, a compound parabolic collector, a cone, and a V-shaped guide.

20. A device of claim 13, wherein the device is a wireless communication device.

* * * * *